United States Patent
Albot et al.

(10) Patent No.: US 10,157,144 B2
(45) Date of Patent: Dec. 18, 2018

(54) METHOD TO SHARE A COHERENT ACCELERATOR CONTEXT INSIDE THE KERNEL

(71) Applicant: International Business Machines Corporation, Armonk, NY (US)

(72) Inventors: Andre L. Albot, Austin, TX (US); Vishal C. Aslot, Austin, TX (US); Mark Rogers, Round Rock, TX (US); Randal C. Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/861,219

(22) Filed: Jan. 3, 2018

(65) Prior Publication Data

US 2018/0129609 A1    May 10, 2018

Related U.S. Application Data

(63) Continuation of application No. 14/986,980, filed on Jan. 4, 2016, now Pat. No. 9,898,417, which is a (Continued)

(51) Int. Cl.
*G06F 12/1009* (2016.01)
*G06F 3/06* (2006.01)
(Continued)

(52) U.S. Cl.
CPC ........ *G06F 12/1009* (2013.01); *G06F 3/0611* (2013.01); *G06F 3/0659* (2013.01);
(Continued)

(58) Field of Classification Search
CPC combination set(s) only.
See application file for complete search history.

(56) References Cited

U.S. PATENT DOCUMENTS 6,289,432 B1 *  9/2001  Ault ............... G06F 12/109
                                                711/147
8,719,543 B2 *  5/2014  Kaminski ....... G06F 9/5016
                                                711/206
(Continued)

OTHER PUBLICATIONS

Tanenbaum, A.S., Structured Computer Organization, 2nd Edition, Prentice Hall, 1984, p. 11.

*Primary Examiner* — Eric Cardwell
(74) *Attorney, Agent, or Firm* — Patterson + Sheridan, LLP

(57) ABSTRACT

Embodiments disclose techniques for sharing a context for a coherent accelerator in a kernel of a computer system. A request is received from a first application to perform an I/O operation within a kernel context. The request specifies a first effective address distinct to the first application. The first effective address specifies a location in a first effective address space and a first effective segment identifier. The first effective address is remapped to a second effective address. The second effective address specifies a location in a second effective address space of the kernel context and a second effective segment identifier. A virtual address mapping to a virtual address space within the kernel context is determined. The virtual address is translated to a physical memory address.

20 Claims, 7 Drawing Sheets

Related U.S. Application Data continuation of application No. 14/885,741, filed on Oct. 16, 2015.

(51) Int. Cl.
    *G06F 12/1027* (2016.01)
    *G06F 13/00* (2006.01)

(52) U.S. Cl.
    CPC ........ *G06F 3/0673* (2013.01); *G06F 12/1027* (2013.01); *G06F 13/00* (2013.01); *G06F 2212/1024* (2013.01); *G06F 2212/68* (2013.01)

(56) References Cited

U.S. PATENT DOCUMENTS

| | | |
|---|---|---|
| 8,719,573 B2 | 5/2014 | Ran et al. |
| 2017/0109290 A1 | 4/2017 | Albot et al. |
| 2017/0109291 A1 | 4/2017 | Albot et al. |

* cited by examiner

METHOD TO SHARE A COHERENT ACCELERATOR CONTEXT INSIDE THE KERNEL

CROSS-REFERENCE TO RELATED APPLICATIONS

This application is a continuation of U.S. patent application Ser. No. 14/986,980, filed Jan. 4, 2016, which is a continuation of co-pending U.S. patent application Ser. No. 14/885,741, filed Oct. 16, 2015, all of which is herein incorporated by reference in its entirety.

BACKGROUND

Embodiments presented herein generally relate to FPGA-based coherent accelerators, and more specifically, to sharing kernel context of a FPGA-based coherent accelerator.

Traditional hardware accelerators (e.g., PCI-based accelerators) perform operations requiring direct memory access (DMA) via a stack that includes a number of layers, providing user applications with access to the hardware accelerator. The hardware accelerator directs the call to a physical memory address in a storage device attached to the hardware accelerator. The hardware accelerator sets up DMA to corresponding pages of physical memory for the application (i.e., a buffer for the application). Doing so allows the hardware accelerator to arbitrate on a connected bus (e.g., a PCI bus) to transfer I/O operations and system calls to the storage device via a series of SCSI commands executed in the hardware accelerator.

Some FPGA-based hardware accelerators provide an application with direct access to the hardware accelerator. For example, an FPGA-based coherent accelerator allows an application to execute SCSI commands directly within application memory. In contrast to traditional hardware accelerators that need physical addresses to execute bus commands, coherent accelerators use effective addresses to issue bus commands to an attached storage device. As a result, an operating system does not need to perform actions that are typical (and computationally expensive) to a traditional hardware accelerator, such as translating effective addresses to physical addresses, which requires steps such as pinning memory pages to prevent page faults. A coherent accelerator translates effective addresses to real addresses while accelerating a function. Therefore, the operating system, via the coherent accelerator, allows page faults to occur, handling the page faults such that the accelerator may continue to access application memory. This approach greatly reduces the length of instructions required to set up a DMA path for data transfer. Further, coherent accelerators allow developers to customize applications to more efficiently use the FPGA.

To access the coherent accelerator, an application attaches application memory to a hardware context of the coherent accelerator. A hardware context may include a page table that maps application memory to pages of the page table. Further, a hardware context may include a segment table for processors that have a segmented architecture, which specify which virtual pages belong to a given segment. Generally, a coherent accelerator has a limited amount of hardware contexts. To address this limitation, the coherent accelerator may allow processes to share contexts with one another in either user space or kernel space.

SUMMARY

One embodiment presented herein describes a method. This method generally includes receiving a request from a first application to perform an I/O operation within a kernel context, wherein the request specifies a first effective address of a local effective address space distinct to the first application and wherein the first effective address specifies a location in the local effective address space of the kernel context and a first effective segment identifier. The method includes remapping the first effective address to a second effective address in a global effective address space shared by the first application and at least a second application, wherein the second effective address specifies a location in the global effective address space of the kernel context and a second effective segment identifier. Additionally, the method includes determining, by a lookup using the second effective segment identifier on a page table and a shared segment table, a virtual address. The method also includes translating the virtual address to a physical memory address.

DETAILED DESCRIPTION

Figure 1:
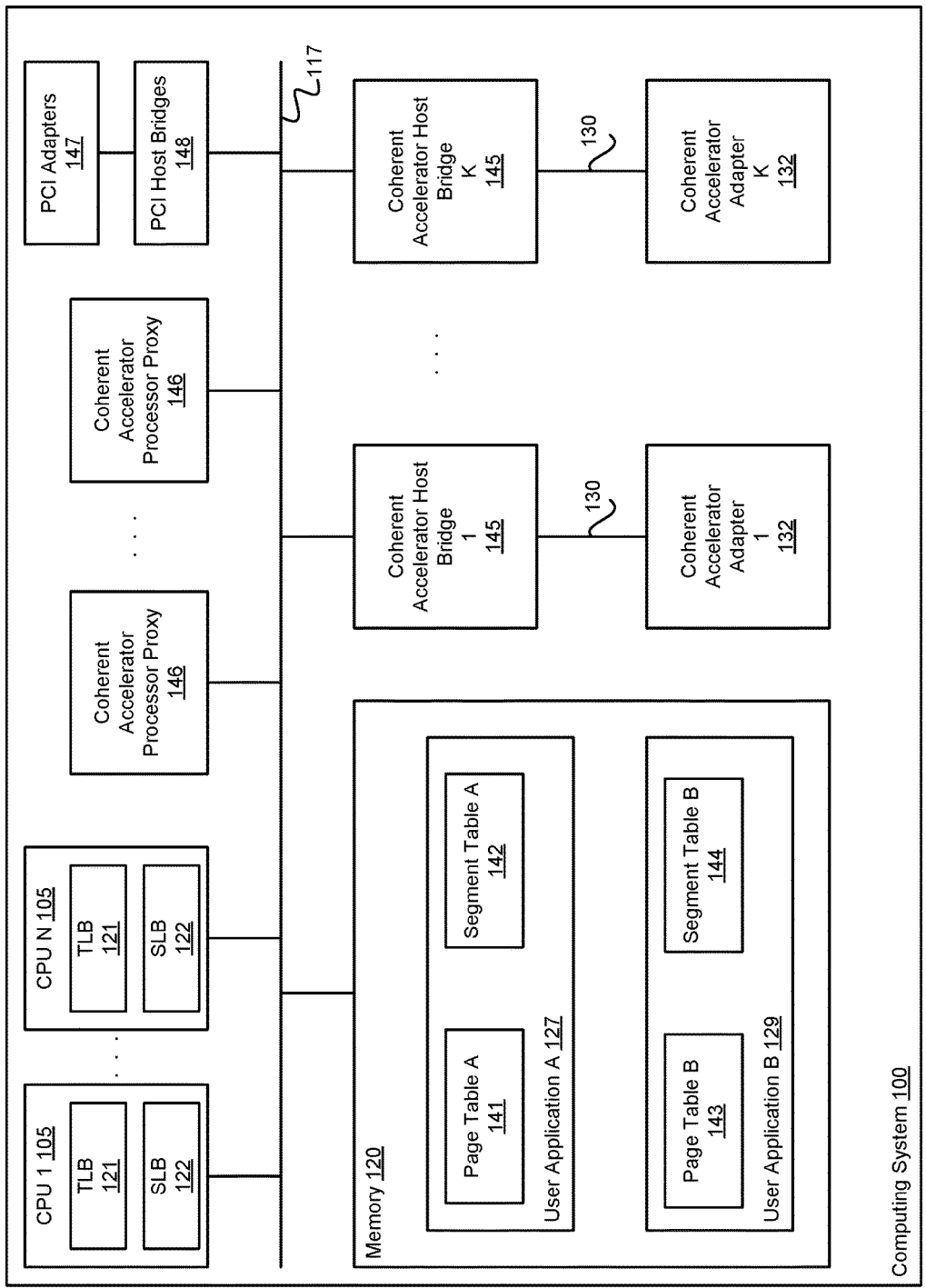
FIG. 1 illustrates an example computing system configured with a coherent accelerator, according to one embodiment.

Embodiments presented herein disclose techniques for sharing a coherent accelerator kernel context between user space processes and libraries. An FPGA-based coherent accelerator includes a number of hardware contexts in user space and kernel space. These contexts provide processes (executing in a computing system) with direct access to the coherent accelerator via effective addresses (as opposed to real addresses in physical memory). As a result, the coherent accelerator significantly reduces the amount of instructions needed for I/O operations and system calls for direct memory access (DMA), particularly when compared to a traditional PCI accelerator.

In one embodiment, a hardware context includes a page table and a number of segment tables. The page table and segment tables allow the coherent accelerator to identify a location in virtual address space in which memory of a mapped process is located. The page table is a global table that maps memory pages to a given process. Further, segment tables specify which memory pages belong to which segment of a given process. Each process may include a distinct segment table in the context. In contrast to traditional PCI accelerators, applications can execute instructions that directly interface with a coherent accelerator.

Typically, the amount of hardware contexts used by the coherent accelerator is limited. For example, a coherent accelerator may include a few hundred contexts available to processes executing in the computing system. However, the coherent accelerator allows processes to share contexts if the amount of processes exceeds the total amount of contexts, which in turn allows a greater amount of processes to access the coherent accelerator.

In one embodiment, the coherent accelerator includes a device driver that reserves one or more contexts ("kernel contexts") that applications may share. Each kernel context provides a global virtual address space. The global virtual address space is not associated with any specific user process. Further, the global virtual address space is associated with a global segment table that maps effective addresses to the global virtual address space. The coherent accelerator may receive requests from applications to use the accelerator (e.g., requests to perform I/O operations). Each request may specify an effective address to a location in a private segment table (i.e., a local segment table associated with the process).

However, the global effective address space is not distinct among processes. For example, a process A and a process B can both include an effective address of ABCD, each effective address referencing data corresponding to a private segment table location for the respective process. Mapping the effective addresses as is to a global segment table would result in duplicate segment table entries. The presence of duplicate entries prevents the coherent accelerator from directly using the effective addresses. To solve this issue, the coherent accelerator remaps the effective address specified in the request to an effective address in the global segment table. For example, assume that two applications send a read I/O request, where the first application sends the request to an address ABCD of its corresponding segment table, and the second application sends the request to an address ABCD of its corresponding segment table. The coherent accelerator may receive both requests and remap the addresses to distinct locations in the global segment table of the kernel. For example, the coherent accelerator may remap the address specified by the first application to address 0123 of the global segment table and the address specified by the second application to address 5678 of the global segment table. Doing so maps each address in the respective private segment tables to an address in the global segment table and allows the coherent accelerator to access memory of each application without conflict. Effectively, the first and second applications share the kernel context with one another.

Advantageously, the global segment table allows user space processes to share kernel contexts, which allows the coherent accelerator to achieve scalability in the number of processes that exploit the coherent accelerator. A user space process may continue to use its own effective address space to access its memory on the central processing units (CPUs). That is, because the coherent accelerator maps the effective addresses to the global segment table, the user space process may remain unaware of the global address space provided in the kernel. The coherent accelerator may track, via the global segment table, memory addresses belonging to a given process. Once the I/O completes (i.e., an acceleration for a request is complete), the device driver for the coherent accelerator deletes the remapped address from the global segment table.

Note, the following describes a coherent accelerator processor interface (CAPI) as a reference example of a FPGA-based coherent accelerator that remaps effective addresses of user space processes (e.g., applications, libraries, etc.) to a global address space in a kernel context. However, one of skill in the art will recognize that the embodiments disclosed herein may be adapted to a variety of coherent accelerators configured to provide that allows sharing of hardware contexts between user space applications and libraries.

FIG. 1 illustrates an example computing system 100 configured with an FPGA-based coherent accelerator, according to one embodiment. As shown, computing system 100 includes one or more central processing units (CPUs) 1-N 105, one or more coherent accelerator processor proxies (CAPPs) 146, one or more peripheral component interconnect (PCI) adapters 147, one or more PCI host bridges 148, a memory 120, one or more coherent accelerator host bridges 1-K 145, and one or more coherent accelerator adapters 1-K 132. The CPUs 105, CAPPs 146, PCI host bridges 148, memory 120, and coherent accelerator host bridges 145 may each be connected via an interconnect bus 117. Further, the coherent accelerator adapters 132 may each connect with a respective coherent accelerator host bridge 145. The computing system may also include an I/O device interface connecting I/O devices (e.g., keyboard, display, and mouse devices) to the computing system 100. Storage devices may be connected via one of the coherent accelerator adapters 132 or PCI adapters 147. The CPUs 105 each include a translation lookaside buffer (TLB) 121 and a segment lookaside buffer (SLB) 122.

Each CPU 105 retrieves and executes programming instructions stored in the memory 120 as well as stores and retrieves application data residing in the storage devices. The bus 117 is used to transmit programming instructions and application data between the CPUs 105, CAPPs 146, PCI host bridges 148, coherent accelerator host bridges 145, and memory 120. In one embodiment, CPU 105 is representative of the "POWER" microprocessor by IBM.

In one embodiment, the coherent accelerator adapter 132 is a FPGA-based hardware accelerator that may directly access an effective address space of an application (e.g., the user application A 127, user application B 129, etc.). Each application has its own effective address space. For example, a 32-bit process may have an effective address space from $2^0$ to $2^{32}$. Further, each address space comprises a number of virtual memory segments. A segment is logical container of pages. A page is a fixed-size piece of memory. The 32-bit effective address space described in this example may contain up to sixteen segments. As another example, a 64-bit effective address space may contain up to $2^{36}$ segments. Further still, each effective address in a process effective address space includes an effective segment identifier (ESID), which specifies a segment for that effective address.

In some systems, effective addresses in a user application address space do not map directly to real memory. In one embodiment, an operating system of computing system 100 maintains a global virtual address space that maps to real memory. Further, the global virtual address space comprises a number of segments, where each virtual address includes a virtual segment identifier (VSID) that specifies a segment for that virtual address. In addition, each effective address maps into a location in the global virtual address space.

The coherent accelerator adapter 132 provides a general purpose framework for transferring data to and from application memory, without requiring a direct memory access (DMA) setup. As a result, the coherent accelerator adapter 132 significantly reduces the I/O path length (e.g., from tens of thousands of instructions to a few hundred instructions). Further, the coherent accelerator adapter 132 allows developers to customize on the FPGA without having to create additional software to do so. For instance, user application A 127 is an example of a process that is configured to issue commands to the coherent accelerator adapter 132. Other applications that are not configured to issue commands to the coherent accelerator adapter 132 (e.g., user application B) may still execute within the framework provided by the coherent accelerator adapter 132. As further described below, the coherent accelerator adapter 132 provides data transfer between storage devices and applications via a virtual address space. In one embodiment, the coherent accelerator adapter 132 includes a processor service layer (not shown) that translates virtual addresses to real addresses to provide coherence. Further, processor service layer generates page faults and Accelerator Function Unit (AFU)-specific interrupts.

In one embodiment, the user application A 127 includes a page table A 141 and a segment table A 142. In addition, the user application B 129 includes a page table B 143 and a segment table B 144. The page tables 141 and 143 map virtual pages to corresponding physical addresses in memory 120. The segment tables 142 and 144 stores mappings of effective addresses to virtual addresses for their respective application. In one embodiment, the TLB 121 and the SLB 122 of the CPU 105 are lookaside buffers used by the coherent accelerator adapter 132 to maintain recent translations of memory addresses. For instance, the SLB 122 may maintain recent translations of effective addresses to virtual addresses. In addition, the TLB 121 may maintain recent translations of virtual addresses to real addresses. In one embodiment, the page tables 141 and 143, segment tables 142 and 144, TLB 121, and SLB 122 may be included in a memory management unit (MMU). In one embodiment, the CAPPs 146 enforce coherence in the processor service layers of each coherent accelerator adapter 132. To do so, the CAPPs 146 may monitor coherency traffic (e.g., relating to cache coherence, page table coherence, segment table coherence, etc) on the bus 117.

Further, the coherent accelerator adapter 132 may provide a number of contexts in user space and kernel space in that include a shared page table and segment table. Each context may be shared by multiple processes (e.g., user applications A and B) executing in the memory 120. A shared kernel context provides a kernel device driver that interfaces between a given process and the coherent accelerator adapter 132.

Figure 2:
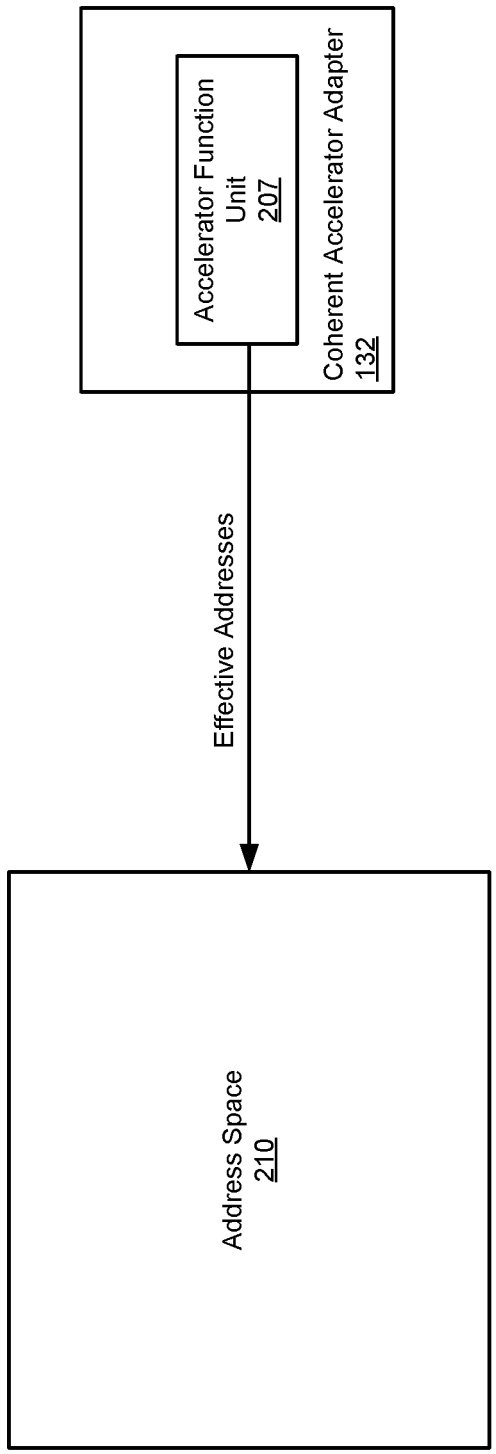
FIG. 2 illustrates an abstraction of data transfer between a process and a coherent accelerator-enabled device, according to one embodiment.

FIG. 2 illustrates an abstraction of data transfer between a coherent accelerator-enabled device (e.g., a storage device) and a process, according to one embodiment. Illustratively, a coherent accelerator adapter 132 allows transfer of data between a storage device and an effective address space 210 of a given application via an accelerator function unit (AFU) 207. The application and the AFU 207 may transfer data to one another using effective addresses.

Each effective address maps to a real address in physical memory. However, because each application using the shared kernel context maintains its own distinct effective address space, rather than directly translate a given effective address to a real address, a kernel device driver executing in the operating system may remap the application-specific effective address to a location in an effective address space global to the other applications using the shared kernel context. The global address space is a virtual mapping of process-specific effective addresses to a shared space. As further described below, the coherent accelerator adapter 132 may then use the remapped effective address to determine a mapping to a real address via a global segment table of the kernel. The global segment table maps effective segment identifiers to a segment identifier of a virtual address.

Figure 3:
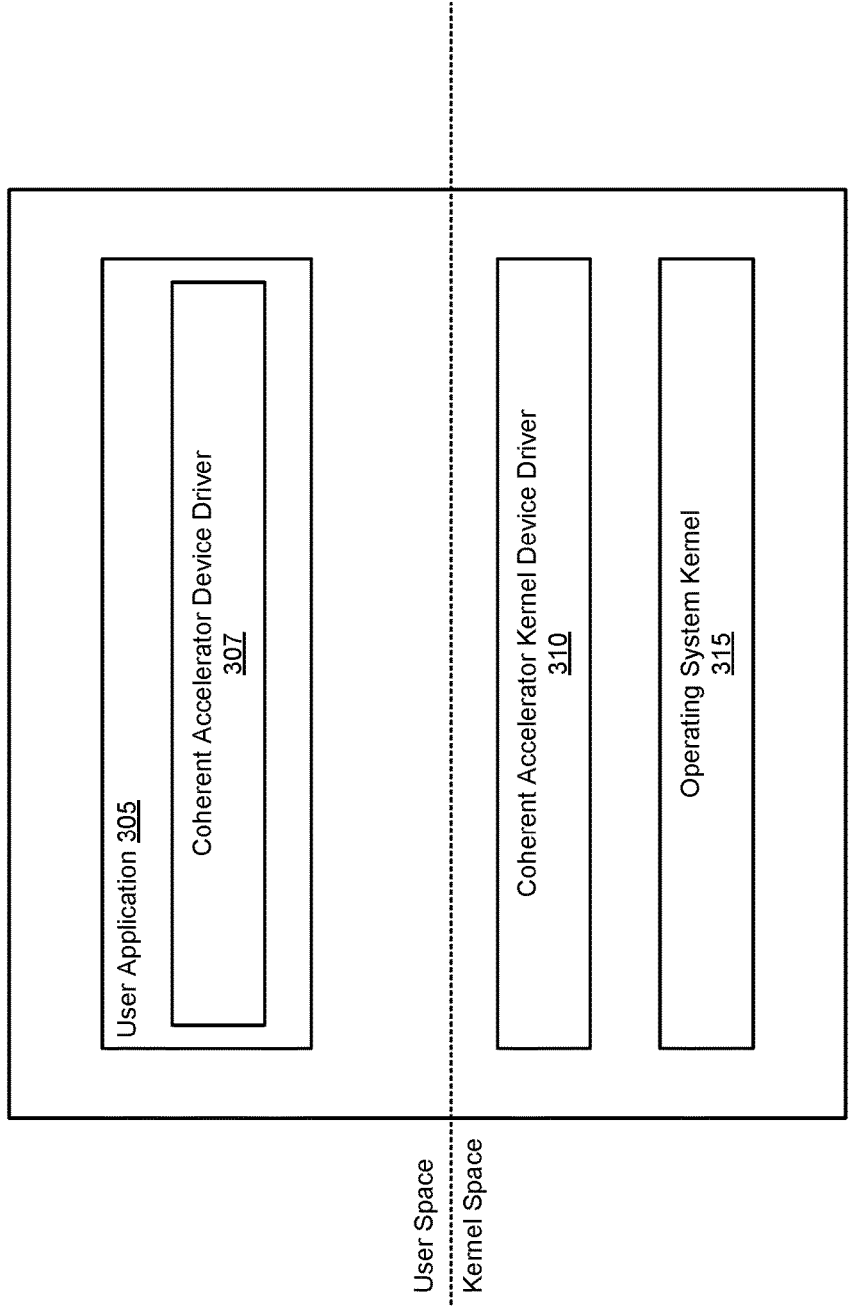
FIG. 3 illustrates an abstraction of a user application configured to communicate with a coherent accelerator, according to one embodiment.

FIG. 3 illustrates an abstraction of a user application 305 configured to communicate with a coherent accelerator, according to one embodiment. Illustratively, FIG. 3 depicts the user application 305 in user space of the operating system of the computer system 100. Further, FIG. 3 depicts a coherent accelerator kernel device driver 310 and an operating system kernel 315 in kernel space of the operating system. The operating system kernel 315 manages memory, tasks, processes, and disks in the operating system.

In one embodiment, the user application 305 includes a coherent accelerator device driver 307. The device driver 307 is a full user-mode driver that enables the user application 305 to communicate with the coherent accelerator adapter 132. Further, the device driver 307 sends I/O operations and commands to the kernel device driver 310. The user application 305 may use its own context to communicate with the coherent accelerator adapter 132 directly without going through the kernel context.

In one embodiment, the coherent accelerator kernel device driver 310 controls the accelerator function unit of the coherent accelerator adapter 132. For example, the kernel device driver 310 may attach and detach contexts to the coherent accelerator adapter 132 on behalf of application memory. Further, the kernel device driver 310 may perform memory-mapped I/O (MMIO) to the coherent accelerator adapter 132. In addition, the kernel device driver 410 may register a kernel context in a storage device. Doing so allows a given process to use DMA services, e.g., to map/unmap requests in the global segment table in the kernel context.

Note, FIG. 3 depicts a user application 305 that is configured with a user space driver (i.e., coherent accelerator device driver 307) which allows the user application 305 to directly communicate with a coherent accelerator adapter 132. However, as further described below, even a user application that is unaware of the coherent accelerator adapter 132 may share a kernel context with another such user application.

Figure 4:
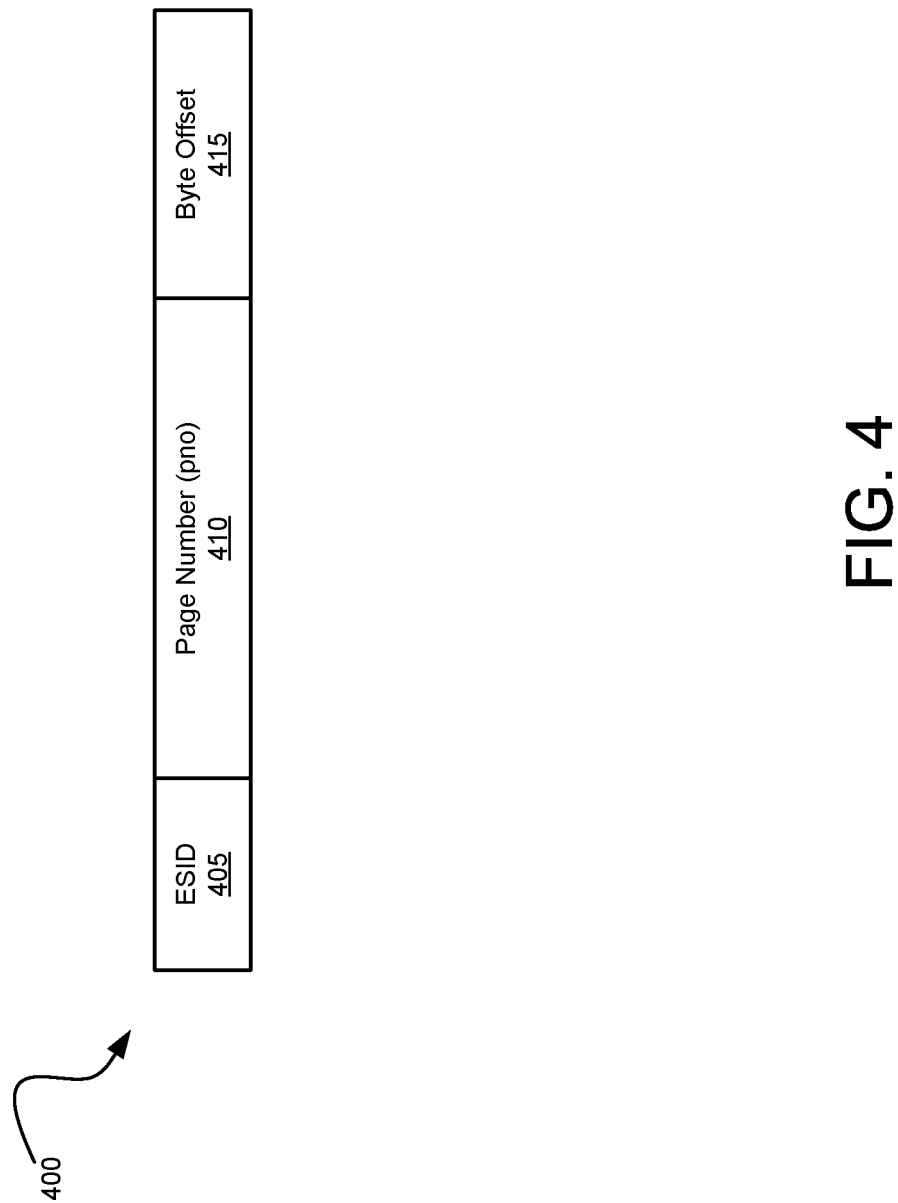
FIG. 4 illustrates an example layout of an effective address, according to one embodiment.

FIG. 4 illustrates an example layout of an effective address 400, according to one embodiment. As shown, the effective address 400 includes an effective segment identifier (ESID) 405, a page number (pno) 410, and a byte offset 415. The ESID 405 specifies a segment in a process effective address space that the effective address 400 belongs to. A given segment may include a range of addresses. For example, in a 32-bit effective address space, an ESID 405 of 0x0 may include a range of addresses 0x0000_0000 to 0x0FFF_FFFF, an ESID 405 of 0x1 may include a range of addresses 0x0000_0000 to 0x1FFF_FFFF, and so on.

Further, the pno 410 specifies an index of a page within that segment. The byte offset 415 specifies an offset of a byte within that page. In practice, for a 32-bit effective address, an ESID 405 of 4 bits, a pno 410 of 16 bits, and a byte offset 415 of 12 bits have shown to be effective. For a 64-bit effective address, an ESID 405 of 36 bits, a page number of 16 bits, and a byte offset of 12 bits has shown to be effective.

Figure 5:
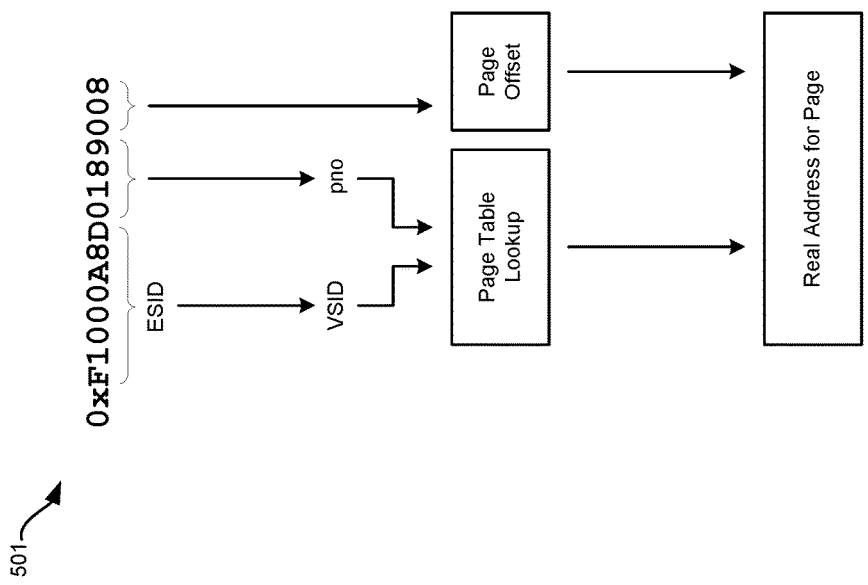
FIG. 5 illustrates an example flow of translating an effective address to a real address, according to one embodiment.

FIG. 5 illustrates an example flow of translating an effective address to a real address in a shared kernel context, according to one embodiment. The kernel device driver may receive a request, e.g., from a process configured to issue bus commands, to perform I/O on a given storage device attached to the kernel device driver. The request may specify an effective address, as depicted by the effective address 501 of 0xF1000A8D0189008. Illustratively, the portion 'F1000A8D' represents the ESID of the effective address 501. The portion '0189' represents the pno of the effective address 501. And the '008' portion represents the page offset of the effective address 501.

In one embodiment, the kernel device driver translates the ESID of the effective address to a corresponding VSID. To do so, the kernel device driver determines a mapping of the effective address of the process to an effective address in the shared kernel context. Doing so allows the kernel device driver to determine the corresponding VSID from the global segment table using the effective address of the shared kernel context. As stated, the global segment table of the kernel may include mappings between ESIDs and VSIDs. The coherent accelerator determines a corresponding VSID based on the mappings in the global segment table. Once the VSID is identified, the coherent accelerator then performs a lookup in the page table using the VSID and pno combination. The coherent accelerator then applies the byte offset in the page resulting from the lookup. As a result, the coherent accelerator can obtain a real address of the application memory of a specific process.

In one embodiment, in addition to remapping the effective address to a real address, the kernel device driver may build a proper command based on the I/O request and queue the command to a command and response queue. Similar to a traditional I/O stack, the application may block other I/O until the queued command completes. The kernel device driver may determine whether to release the I/O before recovering the storage device and then restarting or redriving the I/O.

Figure 6:
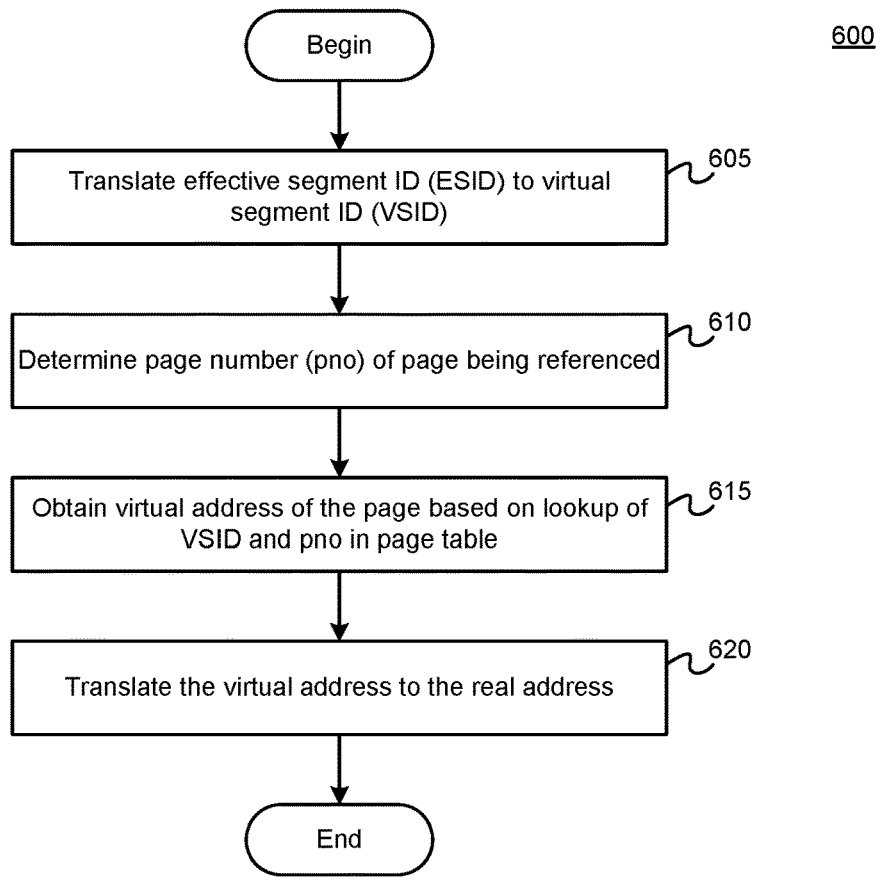
FIG. 6 illustrates a method for translating an effective address to a real address, according to one embodiment.

FIG. 6 illustrates a method 600 for translating an effective address to a real address in a kernel context, according to one embodiment. The kernel device driver may receive a request to perform an I/O operation to a specified effective address in a storage device. As stated, the effective address includes an ESID, a pno, and a byte offset. As shown, method 600 begins at step 605, where the kernel device driver translates the effective segment identifier (ESID) to the virtual segment identifier (VSID). To do so, the kernel device driver remaps the effective address to shared kernel context effective address space. Once determined, the kernel device driver determines a mapping between the ESID to the VSID in the global segment table using the remapped effective address from the shared kernel context address space.

At step 610, the kernel device driver identifies the page number (pno) of the page being referenced. The kernel device driver may obtain the pno from the effective address. At step 615, the kernel device driver determines a virtual address from the effective address provided by the global segment table. To do so, the kernel device driver performs a lookup of the page table using the identified VSID and pno, which results in a real address of a page being identified in the virtual address space. At step 620, the kernel device driver translates the virtual address to the real address. To do so, the kernel device driver may add the page offset specified in the effective address to the real address of the page. As a result, the kernel device driver obtains the real address.

Figure 7:
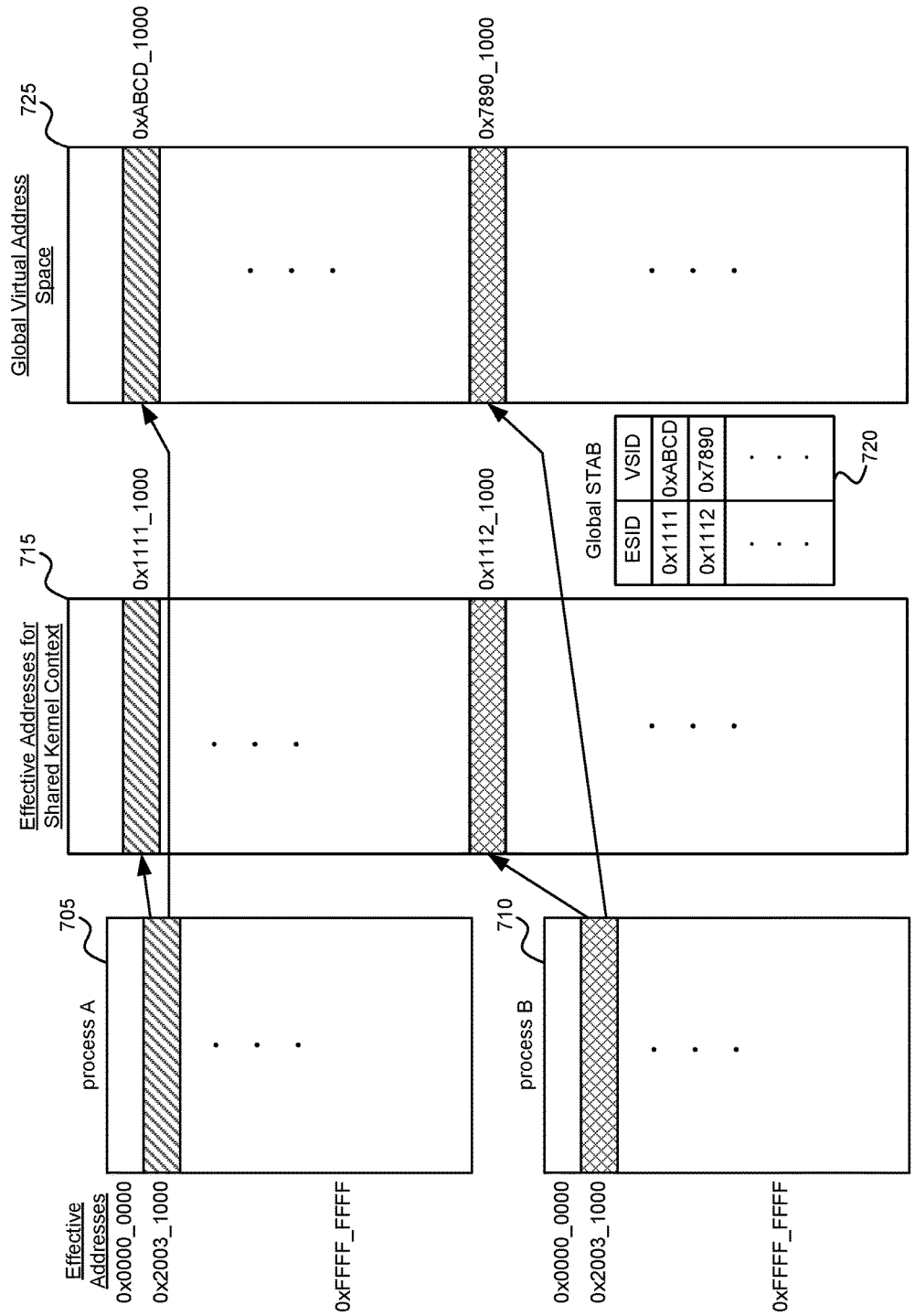
FIG. 7 illustrates an example of mapping effective addresses of processes sharing a coherent accelerator context to a virtual address, according to one embodiment.

FIG. 7 illustrates an example of mapping effective addresses of processes sharing a coherent accelerator context to a virtual address, according to one embodiment. As shown, the example includes an effective address space 705 for a process A, an effective address space 710 for a process B, an effective address space 715 for a shared kernel context, a global segment table (STAB) 720, and a global virtual address space 725. In this example, assume that processes A and B are unaware of the coherent accelerator adapter 132 (i.e., the processes do not include user space device drivers for communicating directly with the coherent accelerator adapter 132). As stated, effective addresses for individual processes do not directly map to the global virtual address space 720. One reason is that each process has a distinct effective address space. For instance, address 0x2003_1000 of process A is a different address from address 0x2003_1000 of process B.

Therefore, the kernel device driver for the coherent accelerator adapter 132 may remap the effective addresses to the effective address space 815 for the shared kernel context. As shown, the effective address 0x2003_1000 of process A maps to 0x1111_1000 in the effective address space 715. Further, the effective address 0x2003_1000 of process B maps to 0x1112_1000 in the effective address space 715. Remapping the process-specific effective addresses to the effective address space 715 allows the coherent accelerator adapter to identify mappings to virtual addresses in the global STAB 720 (using ESIDs and VSIDs).

The global STAB 720 allows the effective addresses in the address space 715 to be mapped to the global virtual address space 725. The global STAB 720 maps each effective address to virtual address using ESIDs and VSIDs. For example, as shown, ESID 0x1111 maps to VSID 0xABCD. And ESID 0x1112 maps to VSID 0x7890. Turning to the global virtual address space 725, the effective address 0x1111_1000 (corresponding to 0x2003_1000 of process A) maps to virtual address 0xABCD_1000. And the effective address 0x1112_1000 (corresponding to 0x2003_1000 of process B) maps to virtual address 0x7890_1000.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present disclosure, other and further embodiments of the invention may be devised without departing from the basic scope thereof, and the scope thereof is determined by the claims that follow.

What is claimed is:

1. A computer-implemented method to provide improved process scalability via kernel-context sharing by multiple user-space processes, the computer-implemented method comprising:
   receiving a request from a first user-space process to perform an I/O operation within a kernel context, wherein the request specifies a first effective address of a local effective address space distinct to the first user-space process, wherein the first effective address specifies a location in the local effective address space of the kernel context and a first effective segment identifier;
   remapping, by operation of one or more computer processors, the first effective address to a second effective address in a global effective address space shared by the first user-space process and at least a second user-space process and in order to avoid conflicting addresses therebetween, wherein the second effective address specifies a location in the global effective address space of the kernel context and a second effective segment identifier; and
   upon determining, by a lookup using the second effective segment identifier on a page table and a shared segment table, a virtual address that maps to a virtual address space within the kernel context, translating the virtual address to a physical memory address, whereafter the I/O operation is performed based on the physical memory address, thereby providing improved process scalability via kernel-context sharing by multiple user-space processes including the first and second user-space processes.

2. The computer-implemented method of claim 1, wherein the kernel context and segment table are shared with the first and second user-space processes.

3. The computer-implemented method of claim 1, wherein the first and second addresses further specify a page number and a byte offset.

4. The computer-implemented method of claim 3, wherein determining the virtual address comprises:
   determining, via the shared segment table based on the second effective segment identifier, a virtual segment identifier; and
   performing a lookup operation in the page table using the virtual segment identifier, page number, and the byte offset.

5. The computer-implemented method of claim 1, further comprising:
   inserting the I/O operation into a command queue.

6. The computer-implemented method of claim 5, wherein the first user-space process blocks other I/O operations until the I/O operation is completed.

7. The computer-implemented method of claim 1, wherein the I/O operation is performed via a coherent accelerator.

8. The computer-implemented method of claim 1, wherein the request is to a coherent accelerator to perform the I/O operation within the kernel context, wherein the coherent accelerator shares virtual memory with the one or more computer processors, wherein the computer-implemented method is performed by a kernel device driver associated with the coherent accelerator, wherein the computer-implemented method further comprises providing an operating system that includes a kernel space in which an operating system kernel and the kernel device driver execute.

9. The computer-implemented method of claim 8, wherein the kernel device driver interfaces between the first and second user-space processes and the coherent accelerator, wherein the kernel device driver controls an accelerator function unit of the coherent accelerator via: (i) attaching and detaching contexts to the coherent accelerator on behalf of application memory; (ii) performing memory-mapped I/O to the coherent accelerator; and (iii) registering a kernel context in a storage device.

10. The computer-implemented method of claim 9, wherein the improved process scalability comprises a process scalability characterized by a total count of processes to which the coherent accelerator is exploitable, wherein the coherent accelerator comprises a field-programmable gate array (FPGA)-based coherent accelerator, wherein the first and second user-space processes are of distinct, first and second applications, wherein the computer-implemented method further comprises outputting an indication that the I/O operation has been performed.

11. The computer-implemented method of claim 10, wherein the kernel context and segment table are each shared between the first and second user-space processes, wherein the first and second addresses further specify a page number and a byte offset, wherein the computer-implemented method further comprises:
   subsequent to the I/O operation being performed, deleting the second effective address from the shared segment table.

12. The computer-implemented method of claim 11, wherein the first effective address is remapped to the second effective address in a manner transparent to the first user-space process, wherein determining the virtual address comprises:
   determining, via the shared segment table based on the second effective segment identifier, a virtual segment identifier; and
   performing a lookup operation in the page table using the virtual segment identifier, page number, and the byte offset.

13. The computer-implemented method of claim 12, further comprising:
   inserting the I/O operation into a command queue, wherein the first user-space process blocks other I/O operations until the I/O operation is completed, wherein the I/O operation is performed via the coherent accelerator.

14. The computer-implemented method of claim 1, wherein the request is to a coherent accelerator to perform the I/O operation within the kernel context.

15. The computer-implemented method of claim 14, wherein the coherent accelerator shares virtual memory with the one or more computer processors.

16. The computer-implemented method of claim 1, wherein the computer-implemented method is performed by a device driver associated with a coherent accelerator.

17. The computer-implemented method of claim 1, wherein the improved process scalability comprises a process scalability characterized by a total count of processes to which a coherent accelerator is exploitable.

18. The computer-implemented method of claim 1, wherein the first and second user-space processes are of distinct, first and second applications.

19. The computer-implemented method of claim 1, subsequent to the I/O operation being performed, deleting the second effective address from the shared segment table.

20. The computer-implemented method of claim 19, wherein the second effective address is deleted by a device driver associated with a coherent accelerator.

* * * * *